E. H. DANFORTH.
Neck-Yoke.
No. 4,672.
Patented July 28, 1846.
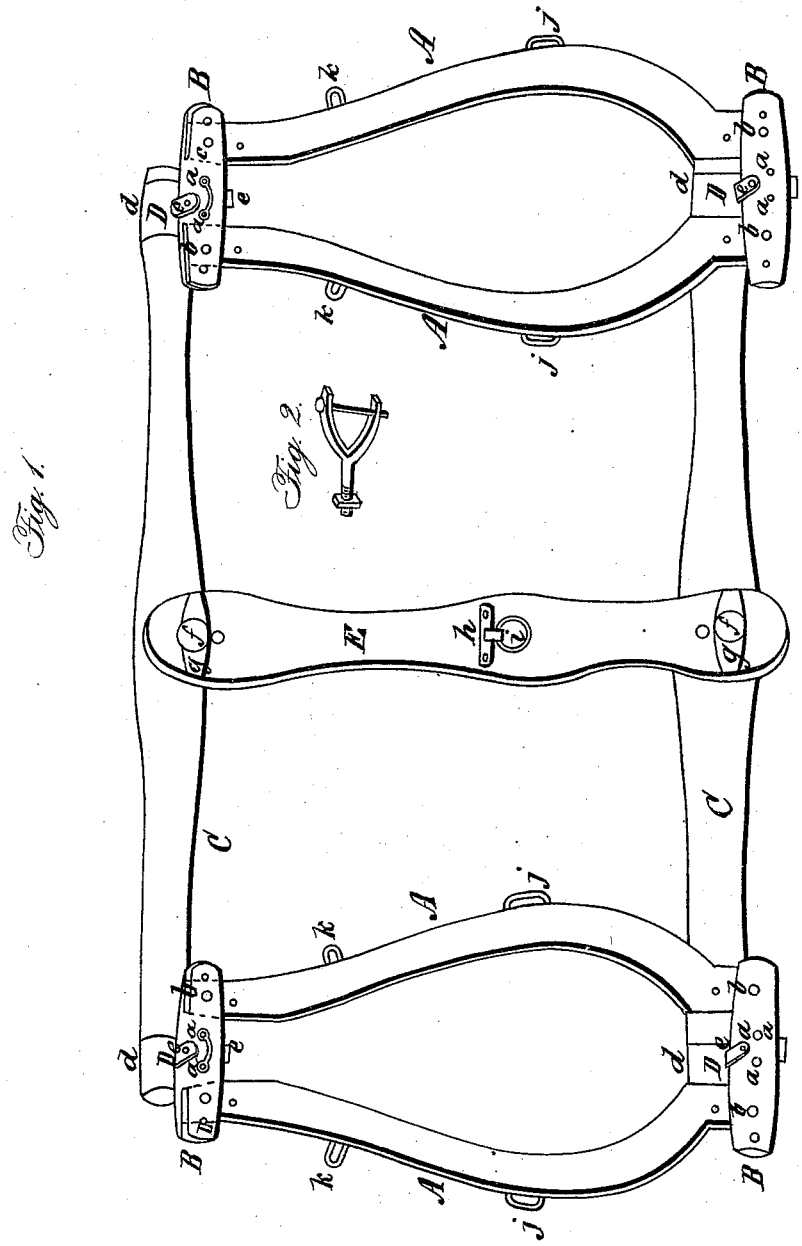

UNITED STATES PATENT OFFICE.

ELIJAH H. DANFORTH, OF BUSTI, NEW YORK.

HORSE-YOKE.

Specification of Letters Patent No. 4,672, dated July 28, 1846.

*To all whom it may concern:*

Be it known that I, ELIJAH H. DANFORTH, of Busti, in the county of Chautauqua and State of New York, have invented a new and useful machine, which I denominate a horse-yoke, to be used in working a pair or span of horses instead of whiffletrees, eveners, neck-yoke, traces, &c., and that the following is an exact description of the same, reference being had to the drawings making a part thereof.

Figure 1, represents a perspective view of the machine. Fig. 2, the clevis by which the whiffletrees are attached to the eveners.

Similar letters in the specification refer to similar letters in the drawing.

The machine consists of two pairs of hames A, A, A, A, so shaped upon the inner side, as to fit a common leather collar, or the horse's breast if used without a collar. They should be sufficiently large to resist the strength of the horse without being too elastic. They may be one inch in thickness, two inches wide at the lower end and one inch and a half wide at the upper end. They may be varied in thickness and width, according to the judgment and convenience of those who use them. The hames, at top and bottom are united by whiffletrees, four in all—B, B, B, B. These should be made round or cylindrical and may be an inch and a quarter in diameter, at the ends, and an inch and a half in the middle. Those at the top of the hame, should be ten inches in length, and those at the bottom, fourteen inches. They may be varied in the judgment of the user, in order to adapt them to the size and strength of his horses. They should be strengthened by bolts passing through them $a, a, a, a, a, a, a, a$. The ends of the whiffletrees are mortised about one-third of their length to receive the hames. These mortises may be about five eighths of an inch wide and should be open at the ends. The whiffletrees are fastened to the hames at the bottom and at the inner end at the top, by bolts $b, b, b, b, b, b$, passing through them both. The outer ends, at the top, are fastened with bolts $c, c$, having a head or projection, by which they may be drawn out with the fingers, in yoking and unyoking. The ends of the whiffletrees should also be bored with one or more holes, besides those occupied with bolts, so that the width of the hames may be enlarged or contracted, as occasion may require. The ends of the hames are fitted to the whiffletrees by making tenons thereon, or by sloping them gradually. They may also be perforated in several places, so as to let the upper whiffletrees drop down when necessary.

The whiffletrees are fastened to the eveners of which there as two $c, c$, by clevises D, D, D, D. These clevises have round shanks which pass through bands around the ends of the eveners $d, d, d, d$, and through the eveners themselves and are fastened at the farther side with iron or steel collars. The clevises are fastened to the whiffletrees which are placed between their forks or prongs, by bolts $e, e, e, e$, passing through their prongs and the whiffletrees, and giving the whiffletrees and hames a rotary motion, so that they may describe, as occasion requires, segments of a circle. Boxes should be placed in the holes in the whiffletrees through which these bolts pass.

The eveners $e, e$, should be three feet long, but may be varied in length if occasion requires. They should be cylindrical in their form, and may be two inches in diameter at the middle, and an inch and a half at the ends. A bar E passes across the eveners, and is fastened to them at each end by iron bolts $f, f$. Between the heads of these bolts and the bar are iron plates $g, g$. That part of the bolts which passes through the plates and bar should be round, and the remainder square or cubic. The object in having that part of the bolts which passes through the bar round, is to enable the bar, to turn a little upon the bolt when one horse is taller than other, or stands on higher ground. And here it should be remarked that the shanks of the clevices are made round so that they may partially revolve in the ends of the eveners through which they pass, or the eveners turn on them, whereby the clevices are made to describe segments of a circle, whenever one of the horses steps upon higher or lower ground than the other. This rotary motion of the clevices gives to the whiffletrees a second rotary motion, in a different direction from that before mentioned, and describing segments of a circle of a much larger radius. This motion, whenever it occurs, causes the eveners to form the long sides of a rhomboid, instead of those of a rectangular parallelogram. These latter motions are very important, and in fact, indispensable, in plowing or harrowing uneven ground, and in a variety of other cases; and effectually prevents the straining or wounding of the necks and shoulders of the horses. One third of the length of the bar from the bottom is a circular hole, just above which, an iron plate and a staple are fastened $h$. An iron ring passes through this staple, to which may be attached a cable, trace, or chain in plowing or similar operations or the snap of a wagon or other vehicle. This ring is marked $i$.

Attached to the hames are four staples $j$, $j$, $j$, $j$, to which may be attached the breeching or straps for holding back when necessary. There are also attached to the hames four other staples above the others and smaller, through which pass the reins for guiding the horses $h$, $h$, $h$, $h$, to the whiffletrees at the top of the hames are attached staples or hooks $l$, $l$, through which pass straps, to which are attached cruppers, the object of which is to keep the yoke in place, when breechings are not used. These staples may be so formed as to constitute the bolts by which the whiffletrees are strengthened; and it will probably be expedient that they should.

What I claim as my invention and wish to secure by Letters Patent is—

1. The connecting of the whiffletrees and evener with the hames, in the manner above stated, thus attaching them to the necks and shoulders of the horses.

2. The manner of attaching the whiffletrees and eveners to each other and the latter to the bar, so as to produce the motion above described.

E. H. DANFORTH.

Witnesses:
 ABNER HAZELTINE,
 SOLOMON JONES.